April 12, 1960

L. J. TORN ET AL 2,932,134

MACHINE TOOL GAGING AND CONTROL

Filed Oct. 9, 1956

INVENTORS
LAWRENCE J. TORN
JAMES P. PHILBIN
BY
ATTORNEYS

INVENTORS
LAWRENCE J. TORN
JAMES P. PHILBIN
BY
ATTORNEYS

United States Patent Office 2,932,134
Patented Apr. 12, 1960

2,932,134
MACHINE TOOL GAGING AND CONTROL

Lawrence J. Torn, Seaford, and James P. Philbin, East Northport, N.Y., assignors, by mesne assignments, to Cutler-Hammer, Inc., Milwaukee, Wis., a corporation of Delaware Application October 9, 1956, Serial No. 614,931

15 Claims. (Cl. 51—165)

This invention relates to gaging and control of machine tools and to instrumentalities for accomplishing the same.

In the machine tool industry it is desirable to be able to gage parts as they are produced, and automatically control the machine tool in accordance with the gage indications. For such purposes accurate gaging, reliable control, and simplicity of apparatus are important. It is also important to be able to adjust the gaging to parts of different dimensions, without impairing the gaging accuracy, and to be able to adjust the control circuits to meet different requirements. These adjustments should be simple and reliable so as not to require undue skill on the part of the operator.

The present invention is particularly directed to the provision of such gaging and control means for automatically controlling machine tools, especially during the final stages of operation.

In some cases the machine tools may not be designed or readily adaptable to automatic control. In such cases the gaging and control means may be used to signal the operator when changes in the machine tool operation are required.

The invention particularly contemplates so-called "in-process" gaging so that continuous information as to part size is obtained. However, the gaging means can also be employed for gaging parts after completion, either for sorting purposes or for adjusting the machine tool for subsequent production.

One of the features of the invention is a gage unit which is simple, rugged and capable of a high degree of accuracy. This accuracy is particularly important when part dimensions must be maintained to a very small tolerance. This is often the case in grinding and similar operations designed to provide a final finish on the parts.

In the specific embodiment the invention is described in connection with the automatic control of grinders of the type wherein the part being ground is held between centers, often termed a "plunge" grinder. Such grinders are often used to provide completely finished parts, and tolerances of the order of one or two ten-thousandths of an inch or less, must often be maintained. This imposes a severe requirement on accuracy of gaging, and also on accuracy of control of the grinder. However, the invention may be applied to other types of machine tools, particularly where accuracy is required.

The invention will be more fully understood by reference to the following description of a specific embodiment thereof, taken in conjunction with the drawings, in which—

Figure 1:
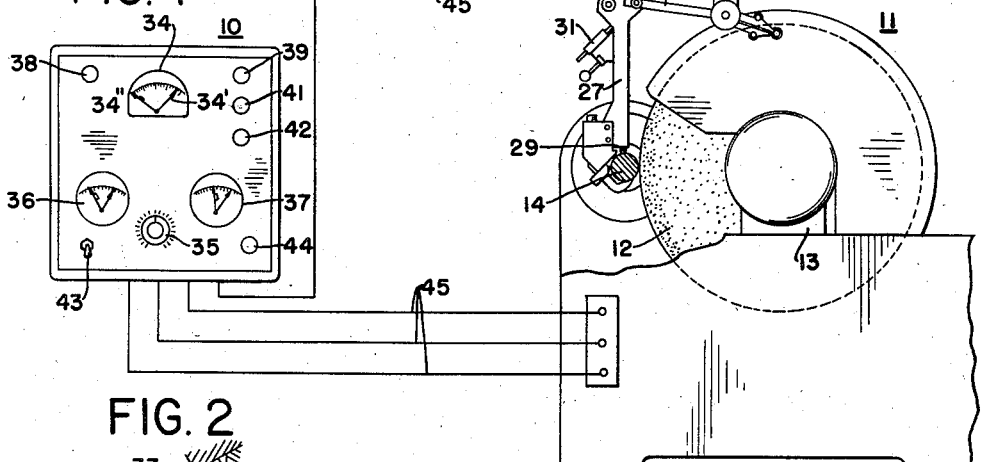
Fig. 1 is a general view of the control unit and grinder arranged for completely automatic control.

Fig. 1 illustrates the combination of a control unit 10 and grinder 11. The grinder comprises a rotating grinding wheel 12 mounted on a carriage 13 which is moved to or away from the workpiece 14 by suitable means (not here illustrated). The workpiece 14 is held between centers in position for grinding. The grinder may be of conventional construction and provided with suitable hydraulic or other means for advancing and retracting the grinding wheel.

In this type of grinder it is common to employ both fast and slow infeeds, so that material can be removed rapidly at the beginning of the operation and more slowly as final size is approached. Even after infeed of the grinding wheel 12 has stopped, wheel pressure on the workpiece still exists, and the surface of the workpiece may be somewhat rough. Therefore, further grinding takes place during the so-called "dwell" or "spark-out" period when the part is brought down to final size.

Figure 3:
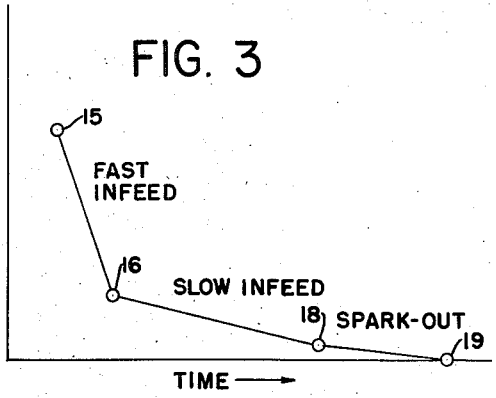
Fig. 3 is a time diagram illustrating changes in the grinder from one condition of operation to another.

This is illustrated in Fig. 3 where point 15 indicates the beginning of the grinding operation. The grinder is shifted to fast infeed during which material is rapidly removed from the workpiece. At point 16 the grinder is shifted to slow infeed, and material is removed more slowly until the part approaches final size, indicated at 18. Infeed is then stopped, but a small amount of grinding continues during the dwell or spark-out period until the part reaches final size at 19. Then the grinding wheel is withdrawn.

The actual rates of feed, and the points at which the grinder is changed from fast to slow infeed, and to spark-out vary widely depending upon the particular grinder, the part being ground, etc.

Figure 4:
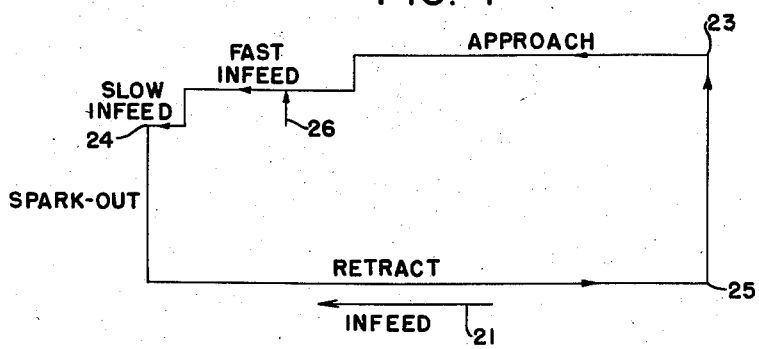
Fig. 4 is a diagram illustrating a representative feed cycle.

Fig. 4 indicates in a different manner the feed cycle of a typical grinder. Here the arrow 21 indicates the direction of infeed (toward the workpiece 14).

After the operator has loaded the work blank, he starts the grinder at point 23 and during the portion labelled "approach" the grinding wheel rapidly advances toward the workpiece until it is nearly in contact therewith. At this point the grinder is changed either automatically or manually to "fast infeed." After the size of the part has been reduced sufficiently, the machine is shifted to "slow infeed" and at point 24, when the part is only slightly over final size, the machine is shifted to dwell or spark-out. When the part reaches final size, the grinding wheel is rapidly withdrawn as indicated by "retract" to point 25. The finished part is then removed, a new blank inserted and the cycle repeated. An automatic stop is usually provided at the end of the retract portion of the cycle.

In order to obtain accurate gaging, it is desirable to limit the full scale range of the gaging caliper and associated circuits. Also, to protect the gaging caliper from damage, excessive heating, etc., during the initial portions of the grinding cycle, it is preferred to place the gaging caliper in measuring position only after some material has been removed from the workpiece. Hence, at an appropriate point in the fast infeed, as indicated by arrow 26 in Fig. 4, the gaging caliper is placed in position on the workpiece.

Returning to Fig. 1, the gaging caliper 27 is shown in measuring position. The caliper is supported by a suitable suspension 28 attached to the body of the machine and advantageously spring-biased so that undue pressure on the workpiece is avoided. Joints in the suspension allow the caliper 27 to be placed in position and removed, The caliper is provided with a movable plunger 29 and suitable stops so that the plunger contacts the workpiece 14 along a diameter thereof. The portion of the gaging caliper described so far may follow conventional construction.

In order to derive signals corresponding to part diameter, a linear variable differential transformer is placed in housing 31 and arranged so that the movable core thereof is responsive to movements of the plunger 29.

Figure 2:
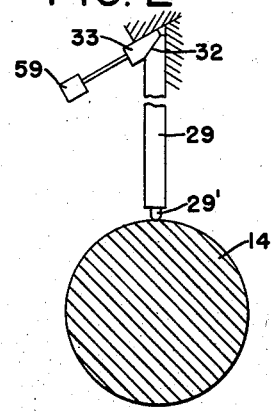
Fig. 2 is a detail of the gaging caliper.

Fig. 2 is a detail showing the movable plunger 29 with a suitable shaped tip 29' in contact with the workpiece 14. The upper surface 32 of the plunger 29 is machined to mate with a corresponding surface of plunger 33, and the movable core 59 of the differential transformer is affixed to plunger 33. The details of differential transformers are well-known in the art and need not be described here. The operation thereof will be described hereinafter in connection with Fig. 5.

The control unit 10 contains gaging, indicating and control circuits which will be described hereinafter in connection with Fig. 5. The front panel is provided with meters, lights and adjusting means, conveniently arranged for the operator.

In order to allow convenient adjustment of the desired final size of the workpiece, and the points at which the machine is changed from fast to slow infeed and then to spark-out, the present invention advantageously employs meters having indicating pointers and adjustable contact pointers. The contact pointers can be set for the part dimensions at which the grinder is to be shifted to successive portions of its cycle. Then, when the indicating pointer touches the contact pointer, a circuit is established to a corresponding relay.

In Fig. 1 meter 34 is the "On Size" meter and has an indicating pointer 34' and an adjustable contact pointer 34". The meter is provided with a scale so that the actual part size can be observed during the finishing operation, and contact pointer 34" is set by means of the scale to the desired final dimension of the part. Knob 35 actuates a calibrated size adjustment element, so that the operator can change the finished size by calibrated amounts to take care of grinder variations during the course of production, without resetting meter 34.

Meter 36 is designated the "Limit A" meter, and its adjustable contact pointer is set by the operator at the desired part dimension when the grinder is to be changed from slow infeed to spark-out. Meter 37 is the "Limit B" meter and the contact pointer is set at the dimension where the grinder is to be changed from fast to slow infeed.

Lamps are also provided to indicate to the operator the condition of the control unit and the grinder. Lamp 38 lights when the gaging caliper is placed in measuring position on the workpiece, and is denoted "Gaging," to indicate that the control unit is then functioning. Lamps 39, 41 and 42 are denoted, respectively, "On Size," "Limit A," and "Limit B," and indicate to the operator that the corresponding control relays have been actuated. In the event that automatic control of the grinder is not employed, these lamps can be used to tell the operator when he should change the operation of the grinder.

The unit also includes a power switch 43 and a lamp 44 to indicate when power is on. The units are interconnected by lines 45.

Figure 5:
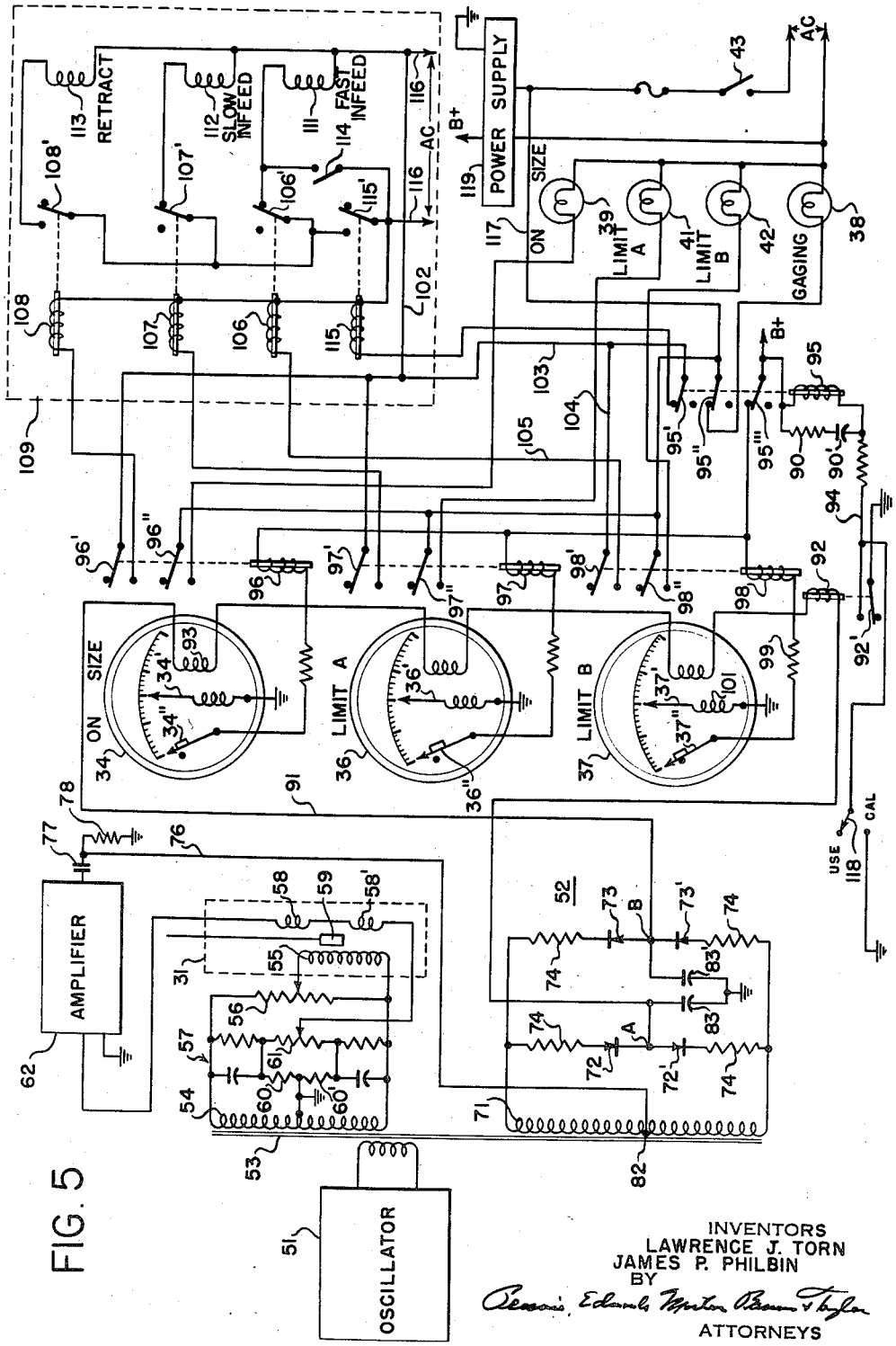
Fig. 5 is a circuit diagram of the control unit and associated circuits of the grinder.

Referring now to Fig. 5, an oscillator 51 is provided for energizing the differential transformer 31 and the detector 52. The oscillator may be of conventional design and its frequency may be selected to meet the requirements of the particular differential transformer selected. A frequency of the order of 5000 cycles has been employed with success. The oscillator should provide an output wave of stable frequency and amplitude so that accuracy of measurement will not be impaired.

The output of oscillator 51 is supplied through a transformer 53 having a center-tapped secondary winding 54 to the primary 55 of the differential transformer. A potentiometer 56 is inserted as a gain control. The center tap is grounded as indicated, and a balanced phase shifting network generally indicated as 57 is inserted for purposes to be hereinafter described.

The secondary coils 58 and 58' of the differential transformer are connected in opposition, so that when the movable core 59 is in its central or null position, the voltage across coils 58, 58' in series will be a minimum. Coil 58 is connected to amplifier 62, and the input of the amplifier is referenced to ground so that the A.-C. output voltage of the differential transfer is amplified therein. The amplifier 62 may follow conventional design practices, stable gain being the important feature to insure accuracy of measurement.

In connection with Fig. 1, knob 35 was described as actuating a calibrated size adjustment element. This element is potentiometer 61 in Fig. 5, and coil 58' is connected to the slider on the potentiometer. The potentiometer is in parallel with two equal resistors 60, 60' whose junction is connected to the center tap of transformer secondary 54 and also grounded. It will therefore be seen that by changing the position of the slider, an A.-C. voltage of adjustable amplitude may be added to the output A.-C. voltage of the differential transformer. The phase shifting network 57 is designed so that the added voltage from potentiometer 61 is exactly in phase, or out of phase, with the output of the differential transformer, depending on whether the slider is on one side of the center position or the other.

With a stable oscillator 51, the potentiometer 61 can be calibrated in, for example, ten-thousandths of an inch, so that the operator can alter the size of the finished part by known increments. This greatly facilitates the usefulness of the control unit. For example, when the part has reached the final size set on the "On Size" meter 34, and a signal is sent to the grinder which actuates the withdrawal mechanism, there is some delay in actual withdrawl of the grinding wheel and a small amount of material is still removed. Thus the actual size set on the "On Size" meter is slightly over the size desired in the finished part. Dut to changes in the condition of the grinding wheel, and to other factors such as temperature, the amount of material removed after the retraction signal is given may vary. Thus, it is important to enable the operator to change the "on size" dimension so as to compensate for this effect. Such changes will ordinarily be quite minute. The calibrated potentiometer 61 permits making these changes without affecting the normal "on size" meter adjustment. The calibrated size control also facilitates initial setup, since if the adjustment of caliper 27 is not precisely correct, the calibrated potentiometer 61 can give a compensating adjustment.

The movable core 59 of the differential transformer is arranged to move with the plunger 29 of the gaging caliper as described in connection with Figs. 1 and 2.

Figure 6:
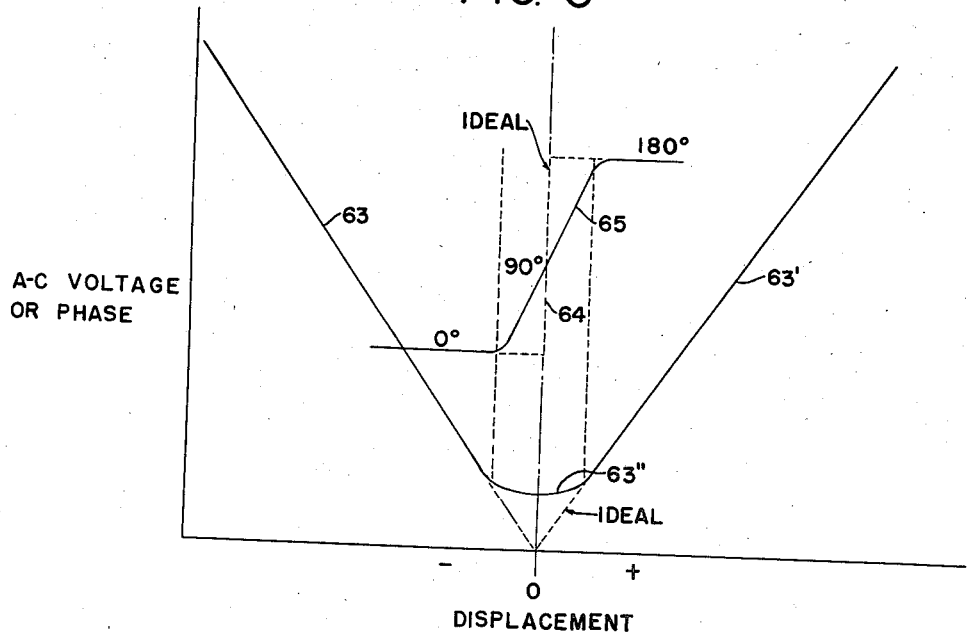
Fig. 6 shows representative curves of a linear variable differential transformer.

The characteristics of a differential transformer are well known, and representative characteristics are shown in Fig. 6. In this figure the straight lines 63, 63' represent the A.-C. voltage output across the transformer secondary coils 58, 58' for displacements on either side of the zero or null position. Although ideally the output voltage should be zero in the central position of the movable core, in practice it is found that it does not reach zero but is flattened as indicated at 63". The ideal characteristic is indicated by dotted lines. Due to the failure of the output voltage to reach zero at the null position, and due to the flattening of the characteristic in region 63", the sensitivity of the transformer is greatly reduced in this region. This is detrimental to obtaining accurate gaging information, particularly when parts must be held to very small tolerances.

The phase of the output voltage reverses as the core moves through the zero or null position. Ideally the phase would reverse instantaneously as shown by the dotted line 64. In practice, however, the shift takes place more gradually as indicated by the curve 65. The displacement required to change from 0° to 180° in phase is substantially equal to the non-linear portion 63" of the voltage characteristic.

In accordance with the present invention a detector circuit is employed to convert the A.-C. output of the differential transformer to a corresponding D.-C. output whose polarity reverses with reversal in phase of the A.-C. wave. The detector is arranged so that in the region where the voltage and phase characteristics differ from the ideal, both amplitude and phase of the A.-C. wave are employed to develop a corresponding D.-C. signal. This gives a substantially linear variation of output voltage in the null region as well as in those regions considerably away from the null.

The detector is generally indicated at 52 in Fig. 5. A reference A.-C. voltage is obtained from oscillator 51 through the center-tapped secondary 71 of transformer 53. This is applied to a bridge circuit containing two pairs of unilaterally conducting elements, here shown as crystal diodes 72, 72', and 73, 73'. Matched resistors 74 are inserted in series with the crystal diodes to eliminate the effect of diode forward impedance mismatch with the secondary 71 of the transformer.

Figure 7:
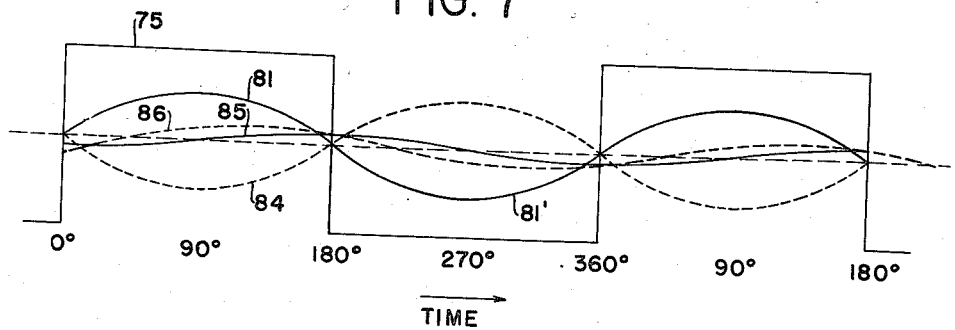
Fig. 7 is explanatory of the detector circuit used in Fig. 5.

The amplitude of the oscillator voltage across secondary 71 is made sufficiently high so that diodes 72, 72' become strongly conducting in one half of the cycle, and diodes 73, 73' become strongly conducting in the other portion of the cycle. This is indicated in Fig. 7 by the square wave 75. Actually, if wave 75 were considered to be the voltage across secondary 71, it would be a sine wave of large amplitude compared to the other waves shown. The switching action of such a sine wave closely approximates the ideal switching curve 75.

Due to the balanced construction, with only the oscillator voltage applied to the detector, point A will be at the same potential as point B in the bridge circuit.

The output of amplifier 62 is fed through line 76 to the center tap 82 of secondary 71. A blocking condenser 77 and resistor 78 to ground are provided so that the A.-C. voltage from amplifier 62 is referenced to ground as it is applied to the detector 52.

Referring back to Fig. 6, if the core 59 of the differential transformer is considerably displaced from the null in the minus direction, the output voltage indicated by line 63 will vary substantially linearly with displacement and the phase will be constant, here designated as 0° phase. This condition of operation is indicated in Fig. 7 where the sine wave 81 is shown to be in phase with the reference wave 75. The phase shift in amplifier 62 is selected so that the proper phase relationship with the reference voltage from transformer secondary 71 is obtained.

The sine wave 81 represents the differential transformer output voltage at the center tap 82 of the transformer secondary 71 (Fig. 5) and it is assumed that diodes 72—72' are conducting in this interval. Thus the voltage at point A will become positive and produce a voltage across storage condenser 83. During the negative portion of the wave 81, indicated as 81', diodes 73, 73' will be conducting and a negative voltage will be produced across storage condenser 83'. Thus point A will be positive to point B and the condensers will, by virtue of their filtering action, produce a substantially steady D.-C. voltage.

If the differential transformer core 59 is considerably displaced in the plus direction in Fig. 6, the output wave will be of opposite phase (180°), and will correspond to the dotted sine wave 84 in Fig. 7. Under these conditions, point B in Fig. 5 will be positive to point A, the reverse of the previous condition. As the amplitude of displacement changes, the amplitude of waves 81 or 84 will change, and the magnitude of the D.-C. voltage between points A and B will correspondingly change. However, as will be observed from Fig. 6, the phase of the waves will not change over most of the operating range, and the polarity of the D.-C. voltage between points A and B will correspond to 0° or 180°, as the case may be.

Near the null, when the differential transformer characteristics depart from the ideal, the phase of the A.-C. voltage applied to the detector 52 will change with respect to the reference voltage. In Fig. 7 the wave 85 represents the condition for zero displacement. This wave is of very small but finite amplitude, as will be seen from Fig. 6. Its phase will be 90° with respect to the reference wave 75. Under these conditions the condenser 83 in Fig. 5 will be charged by equal amounts in the negative and positive directions while diodes 72, 72' are conducting, and consequently the voltage across capacitor 83 will be zero. The same is true in the next half cycle and the voltage at point B will be zero. Consequently in the zero displacement condition, no voltage will exist between points A and B even though the output A.-C. voltage from the differential transformer is not zero. This is the situation which would be obtained if the differential transformer were ideal.

Between 0° and 90°, the voltage at point A will vary both with amplitude and phase. Dotted wave 86 in Fig. 7 represents such a condition. From the previous discussion it will be understood that under this condition condenser 83 will be charged positively for a longer time than it is charged negatively, and consequently a net positive voltage will be produced at point A. Similarly, a net negative voltage will appear across condenser 83'.

In a similar manner, if the phase of the signal wave is between 90° and 180° a net negative voltage will appear across condenser 83, and a net positive voltage across condenser 83'.

It can be shown mathematically that the resilient voltage between points A and B will vary substantially linearly in the region near the null, and will be of substantially the same slope as the variation outside of this region, so that the overall output of the detector 52 will vary substantially linearly from the positive region through zero to the negative region.

The output of the detector is used to actuate the meters and associated control circuits. The circuit may be traced from point B in the detector circuit through line 91 to the actuating coils of meters 34, 36 and 37, the actuating coil of polarized relay 92, and thence back to point A in the detector.

As previously indicated, these meters are of the type in which an adjustable contact pointer establishes a circuit when contacted by the indicating pointer. Actuating coil 93 moves the indicating pointer 34' in accordance with the strength of the current therethrough. As actually constructed, the indicating pointer 34' is at the extreme left corresponding to zero reading when unenergized, unless it is stopped by the adjustable contact pointer 34". It is indicated off zero in the drawing to avoid confusion. Also, pointers 34' and 34" actually rotate about a common center, as shown in Fig. 1, but are here shown separated for clarity. In the specific embodiment illustrated, positive current flow through actuating coil 93, resulting from a positive potential at B with respect to A in detector 52, causes the deflection of the indicating pointer 34' to the right. The same is true for meters 36 and 37.

Before proceeding to describe the control circuits, the operation of the grinder and circuits associated therewith will be described. These circuits are shown within the dotted box 109 in Fig. 5.

In operation, after the operator has placed the work blank in the machine, the grinder is started and the grinding wheel is rapidly advanced in the "approach"

portion of the cycle shown in Fig. 4. Just before it contacts the workpiece, the grinder is shifted automatically to a fast infeed position and grinding begins. The automatic switch from approach to fast infeed is obtained by the closure of a pressure-operated switch 114 responsive to the pressure in the hydraulic cylinders which produce the infeed. This establishes a circuit from the A.-C. line 116 through fast infeed solenoid 111, which controls a valve in the hydraulic infeed line. As the fast infeed progresses, pressure is reduced and at a selected point in the fast infeed cycle, as indicated by arrow 26 in Fig. 4, the pressure-operated switch 114 opens. This will cause the infeed to stop until the gaging caliper is placed on the workpiece by the operator.

With the gaging caliper off the workpiece, the spring bias in the caliper moves the plunger 29 (Figs. 1 and 2) to its forward position corresponding to a part size smaller than that to be measured. This causes the differential transformer 31 to supply a signal to detector 52 which makes point B negative with respect to point A. Thus a negative current flows through the actuating coils of meters 34, 36 and 37 which moves the corresponding pointers to the left. Negative current also flows through relay 92.

Relay 92 is polarized so that a negative current therethrough will actuate the relay and move contact arm 92' to its upper position. The contact arm is grounded and this grounds line 94. This causes repeating relay 95 to be actuated by closing the circuit to a D.-C. voltage denoted B+. The B+ is obtained from a suitable rectifier power supply 119. Actuation of relay 95 moves contact arms 95', 95" and 95'" to their lower positions.

In the upper position of contact arm 95'", B+ is supplied to the actuating coils of relays 96, 97 and 98 associated with meters 34, 36 and 37. However, when the contact arm is moved to its lower position, the circuit to B+ is broken and relays 96–98 cannot be actuated, regardless of the meter indications. With contact arm 95" in its lower position, the "gating" lamp 38 is unenergized.

Contact arm 95' in its lower position breaks the energizing circuit to relay 115, and the corresponding contact arm 115' is in its open position, as indicated. Thus, when the pressure operated switch 114 is opened midway through the fast infeed cycle, the infeed stops.

Ordinarily the grinder will be provided with a light to indicate that the infeed has stopped. The operator then places the gaging caliper 27 in position on the workpiece as indicated in Fig. 1.

Since the workpiece will be considerably oversize when the gaging caliper is placed in position, the differential transformer and detector 52 will supply a positive current to the meters 34, 36, 37 which will deflect them to the right, and a positive current will flow through polarized relay 92. Accordingly, relay 92 will drop out and contact arm 92' will assume the position shown in the drawing. This breaks the connection from repeater relay 95 to ground, and deenergizes the relay. An R–C circuit 90, 90' is connected across relay 95, as shown, in order to delay the dropout of relay 95 so that meters 34, 36 and 37 may deflect upwards before their lockout circuits can become established.

First considering the effect of dropout of relay 95 on the grinder, when the relay is deenergized the contact arms move to their upper positions as shown. The upper arm 95' is connected to one side of the A.-C. line 116 and through the associated contact supplies A.-C. current to relay 115 which is returned to the other side of the A.-C. line. This closes the switch 115' and establishes a circuit from the A.-C. line to the fast infeed solenoid 111 (relay 106 being in its unactuated position as shown). Thus the grinder starts again in its fast infeed cycle.

Turning now to the meters and the control circuits actuated thereby, as previously indicated the adjustable contact pointer 37" will be set for a certain oversize condition of the workpiece where it is desired to change from fast infeed to slow infeed. When the pointer 37' moves to the left sufficiently to contact pointer 37", a circuit is established from B+ through contact arm 95'", relay coil 98, resistor 99, pointer 37", pointer 37' and locking coil 101 to ground. Locking coil 101, when energized, biases the pointer 37' to the left so as to maintain contact with pointer 37".

The actuation of relay 98 moves the contact arms 98' and 98" to their lower positions. Contact arm 98' has A.-C. impressed thereon through lines 102, 103 and 104. Movement to the lower position supplies this A.-C. through line 105 to the actuating coil of relay 106 in the grinding machine. Actuation of this relay moves contact arm 106' to the left, thus breaking the energizing circuit for the fast infeed solenoid 111. However, contact arm 107' continues to establish an energizing circuit for the slow infeed solenoid 112, since contact arm 115' is in the left position.

Upon subsequent grinding and reduction in size of the workpiece, pointer 36' in the limit A meter 36 will contact pointer 36", thereby establishing a circuit through relay 97 and its own holding circuit, in the manner pointed out in connection with relay 98. Movement of contact arm 97' to the lower position establishes an A.-C. circuit through the actuating coil of relay 107 in the same manner as described for contact arm 98' and relay 106. Movement of relay contact arm 107' to the left breaks the circuit to the slow infeed solenoid 112, thus causing the grinder to shift from slow infeed to spark out.

Finally, when the part has reached its final size as determined by the setting of meter 34, relay 96 is energized and movement of the upper contact arm 96' to its lower position establishes a circuit to relay 108 in the grinder, thereby establishing an energizing circuit for retraction solenoid 113 through arm 108', and the grinding wheel is withdrawn.

Energization of the indicating lamps 39, 41, 42 and 38 is obtained from the A.-C. line through connection 117 to the relay arms 95", 98'", 97" and 96". As relays 98, 97 and 96 are actuated in succession, the corresponding lamps 42, 41 and 39 are lighted. Lamp 38 is lighted through contact arm 95" when the gaging caliper is in position on the workpiece. However, when the gaging caliper is off the workpiece, relay 95 is energized and lamp 38 is out. Also, actuation of relay 95, when the gage is off the workpiece, breaks the B+ supply to relays 96–98, as before described, leaving switch arms 96", 97" and 98" in their upper positions so that lamps 39, 41 and 42 are out.

As will be understood from the foregoing, after one part has been finished, and the gage removed from the workpiece, the control unit is reset for the next cycle of operation by the actuation of polarized relay 92 and the associated circuits.

For convenience in initial setup, calibrate switch 118 is provided. When manually closed, this switch returns relay 95 to ground, thus disabling the control circuits to the grinder and also removing B+ from relays 96–98. This latter prevents the establishment of lockup circuits for meters 34, 36 and 37. In consequence, the tool-setup can proceed accurately with a minimum inconvenience. In the calibrate position (switch 118 closed), the meters still indicate the size of the part so that necessary information for precise setup is obtained.

The invention has been described in connection with a specific embodiment thereof particularly directed to the control of a grinding machine. In the event that the control unit is used with a grinder which does not provide both fast and slow infeeds, the corresponding control circuits can be omitted. The control unit can also be used with other types of machine tools wherein changes in the condition of operation depending upon part size is required.

The use of the size adjustment (potentiometer 61) and associated circuitry, with the detector circuit designed to give a substantially straight line variation through the null region of the differential transformer has been found highly advantageous in practice. However, it is possible to use the size adjustment circuit to confine the gaging operation to one of the straight line portions of the differential transformer characteristic. In such case the requirement for linearity through the null region may not be important and other detector circuits may be employed.

If it is not desired to automatically control the machine tool, or if the tool is not readily adaptable to automatic control, the control unit may be used to provide signals to the operator to indicate when appropriate adjustments in the machine tool should be made.

Various features of the invention may be employed separately if desired. For example, the gaging apparatus, including the differential transformer and the detector, may be employed for precision gaging without regard to the control circuits.

Many modifications of the apparatus described herein will be obvious to those skilled in the art within the spirit and scope of the invention.

We claim:

1. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, a detector adapted to receive an A.-C. input and yield a D.-C. output varying with the amplitude of the A.-C. input and of opposite polarity with respect to a reference potential for opposite phase of the A.-C. input, means supplying the A.-C. output signal from said differential transformer to the input of said detector, circuit means responsive to one polarity of said D.-C. output corresponding to part oversize for developing control signals, and circuit means responsive to the opposite polarity of said D.-C. output for preventing development of said control signals.

2. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, a detector adapted to receive an A.-C. input and yield a D.-C. output varying with the amplitude of the A.-C. input and of opposite polarity with respect to a reference potential for opposite phase of the A.-C. input, means supplying the A.-C. output signal from said differential transformer to the input of said detector, a plurality of meters responsive to one polarity of said D.-C. output corresponding to part oversize and having indicating pointers, said meters having adjustable contact pointers adapted to close an electric circuit when contacted by the respective indicating pointers, control relays having actuating circuits under the control of the pointers on respective meters for developing control signals to control the operation of said machine tool, and relay means responsive to the other polarity of said D.-C. output to prevent development of said control signals.

3. Apparatus for gaging and controlling a grinder having infeed and retraction control means which comprises a removable gaging caliper including a variable differential transformer having a movable element varying with part size and biased to an undersize position, an oscillator for energizing said differential transformer, said differential transformer yielding an A.-C. output signal varying in amplitude with departures from the null position of the movable element and of opposite phase on opposite sides of the null, a detector adapted to receive an A.-C. input and yield a D.-C. output varying with the amplitude of the A.-C. input and of opposite polarity with respect to a reference potential for opposite phase of the A.-C. input, means supplying the A.-C. output signal from said differential transformer to the input of said detector, a plurality of meters responsive to one polarity of said D.-C. output corresponding to part oversize and having indicating pointers, said meters having adjustable contact pointers adapted to close an electric circuit when contacted by the respective indicating pointers, control relays having actuating circuits under the control of the pointers on respective meters and arranged to actuate the infeed and retraction control means of said grinder in accordance with the settings of said adjustable contact pointers, and relay means responsive to the other polarity of said D.-C. output to prevent actuation of said control relays whereby removal of said gaging caliper from the workpiece prevents actuation of said control relays.

4. Apparatus for gaging and controlling a grinder having infeed and retraction control means which comprises a removable gaging caliper including a variable differential transformer having a movable element varying with part size and biased to an undersize position, an oscillator for energizing said differential transformer, said differential transformer yielding an A.-C. output signal varying in amplitude with departures from the null position of the movable element and of opposite phase on opposite sides of the null, an adjustable size control circuit for obtaining an A.-C. correction signal of adjustable magnitude and of selectable opposite phase from the output of said oscillator, circuit means for adding said correction and output signals, a phase-shifting circuit causing said added signals to be substantially in-phase or out-of-phase depending on the actuation of the differential transformer and adjustment of the size control, a detector adapted to receive an A.-C. input and yield a D.-C. output varying with the amplitude of the A.-C. input and of opposite polarity with respect to a reference potential for opposite phase of the A.-C. input, means supplying said added signals to the input of said detector, a plurality of meters responsive to one polarity of said D.-C. output corresponding to part oversize and having indicating pointers, said meters having adjustable contact pointers adapted to close an electric circuit when contacted by the respective indicating pointers, control relays having actuating circuits under the control of the pointers on respective meters and arranged to actuate the infeed and retraction control means of said grinder in accordance with the settings of said adjustable contact pointers, and relay means responsive to the other polarity of said D.-C. output to prevent actuation of said control relays whereby removal of said gaging caliper from the workpiece prevents actuation of said control relays.

5. Apparatus for gaging and controlling a grinder having infeed and retraction control means which comprises a removable gaging caliper including a variable differential transformer having a movable element varying with part size and biased to an undersize position, an oscillator for energizing said differential transformer, said differential transformer yielding an A.-C. output signal varying in amplitude with departures from the null position of the movable element and of opposite phase on opposite sides of the null, an adjustable size control circuit for obtaining an A.-C. correction signal of adjustable magnitude and of selectable opposite phase from the output of said oscillator, circuit means for adding said correction and output signals, a phase shifting circuit causing said added signals to be substantially in-phase or out-of-phase depending on the actuation of the differential transformer and adjustment of the size control, a detector including a pair of circuits each having a pair of substantially unilaterally conductive devices, means for energizing said circuits in parallel from said oscillator in balanced relationship, said unilaterally conductive devices being poled to pass current in alternate circuits during alternate half-cycles of the oscillator output, means supplying said added signals to the point of balance of said energizing means, storage means connected between the unilaterally conductive devices in each circuit and a common reference potential, whereby a substantially D.-C. output is obtained proportional to the amplitude of said added signals and of opposite polarity with respect to a reference potential for opposite phase of said added signals, a plurality of meters responsive to one polarity of said D.-C. output corresponding to part oversize and having indicating pointers, said meters having adjustable contact pointers adapted to close an electric circuit when contacted by the respective indicating pointers, control relays having actuating circuits under the control of the pointers on respective meters and arranged to actuate the infeed and retraction control means of said grinder in accordance with the settings of said adjustable contact pointers, and relay means responsive to the other polarity of said D.-C. output to prevent actuation of said control relays whereby removal of said gaging caliper from the workpiece prevents actuation of said control relays.

6. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, a detector including a pair of circuits each having a pair of substantially unilaterally conductive devices, means for energizing said circuits in parallel from said oscillator in balanced relationship, said unilaterally conductive devices being poled to pass current in alternate circuits during alternate half-cycles of the oscillator output, means supplying the output of the differential transformer to the point of balance of said energizing means, and storage means connected between the unilaterally conductive devices in each circuit and a common reference potential, whereby a substantially D.-C. output may be obtained proportional to departures from the null position of said differential transformer and of opposite sign on opposite sides of said null.

7. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, a detector including a pair of circuits each having a pair of diodes connected in series, means for energizing said circuits in parallel from said oscillator in balanced relationship, said diodes being poled to pass current in alternate circuits during alternate half-cycles of the oscillator output, means supplying the output of the differential transformer to the point of balance of said energizing means, and a pair of condensers connected between the diodes in respective circuits and a common reference potential, whereby a substantially D.-C. output may be obtained proportional to departures from the null position of said differential transformer and of opposite sign on opposite sides of said null.

8. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, a potentiometer supplied with the output of said oscillator in balanced relationship through a phase-shifting network whereby an A.-C. correction signal of adjustable magnitude and of selectable opposite phase may be obtained at the slider of said potentiometer, circuit means for adding said correction and output signals, said phase-shifting circuit causing said added signals to be substantially in-phase or out-of-phase depending on the actuation of the differential transformer and the adjustment of said potentiometer, a detector including a pair of circuits each having a pair of substantially unilaterally conductive devices, means for energizing said circuits in parallel from said oscillator in balanced relationship, said unilaterally conductive devices being poled to pass current in alternate circuits during alternate half-cycles of the oscillator output, means supplying said added signals to the point of balance of said energizing means, and storage means connected between the unilaterally conductive devices in each circuit and a common reference potential, whereby a substantially D.-C. output may be obtained proportional to departures from the null position of said differential transformer and of opposite sign on opposite sides of said null.

9. Apparatus for gaging and controlling a machine tool which comprises gaging means including a gaging device and cooperating circuits for producing a D.-C. output varying with part size and of opposite polarity with respect to a reference potential in oversize and undersize regions, said gaging device being adapted for removable positioning on a part to be gaged and having a movable gaging element biased toward engagement with said part, circuit means responsive to variations in said D.-C. output of one polarity for developing control signals, and circuit means responsive to the other polarity of said D.-C. output for preventing development of said control signals.

10. Apparatus for gaging and controlling a machine tool which comprises gaging means including a gaging device and cooperating circuits for producing a D.-C. output varying in amplitude with part size and of opposite polarity with respect to a reference potential in oversize and undersize regions, said gaging device being adapted for removable positioning on a part to be gaged and having a movable gaging element biased toward engagement with said part, relay means responsive to variations in said D.-C. output of one polarity for developing control signals for controlling the operation of said machine tool, and relay means responsive to the other polarity of said D.-C. output for preventing development of said control signals.

11. Apparatus for gaging and controlling a machine tool which comprises a gaging device adapted for removable positioning on a part to be gaged and having a movable element biased toward engagement with said part, said gaging device including a differential transformer variable by movement of said movable element, an A.-C. power source for energizing said differential transformer, said differential transformer yielding an A.-C. output signal varying in amplitude with departures from the null position thereof and of opposite phase on opposite sides of the null, an adjustable size control circuit for obtaining an A.-C. correction signal of adjustable magnitude and of selectable opposite phase from said A.-C. power source, a detector adapted to receive an A.-C. input and yield a D.-C. output varying with the amplitude of the A.-C. input and of opposite polarity with respect to a reference potential for opposite phase of the A.-C. input, circuit means for adding said A.-C. correction and output signals and supplying the added signals to the input of said detector, a meter responsive to one polarity of said D.-C. output and having in indicating pointer, an adjustable contact pointer in said meter adapted to close an electric circuit when contacted by said indicating pointer, a control relay having an actuating circuit under the control of said pointers for developing control signals for controlling the operation of said machine tool, and relay means responsive to the other polarity of said D.-C. output for preventing development of said control signals.

12. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, a detector including a pair of circuits each having a pair of substantially unilaterally conductive devices connected in series, means for energizing said circuits in parallel from said oscillator in balanced relationship, said unilaterally conductive devices being poled to pass current in alternate circuits during alternate half-cycles of the oscillator output, storage capacitor means connected between points of said circuits which are between the unilaterally conductive devices in respective circuits, a capacitor connected to the point of balance of said energizing means, and means for supplying the output of said differential transformer through said capacitor to said point of balance, whereby a substantially D.-C. output may be obtained proportional to departures from the null position of said differential transformer and of opposite sign on opposite sides of said null.

13. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, an amplifier connected to said differential transformer for amplifying the output thereof, a phase-sensitive detector including a pair of circuits each having a pair of diodes connected in series, means for energizing said circuits in parallel from said oscillator in balanced relationship, said diodes being poled to pass current in alternate circuits during alternate half-cycles of the oscillator output, storage capacitor means connected between points of said circuits which are between the diodes in respective circuits, a capacitor connected to the point of balance of said energizing means, and means for supplying the output of said amplifier through said capacitor to said point of balance, whereby a substantially D.-C. output may be obtained proportional to departures from the null position of said differential transformer and of opposite sign on opposite sides of said null.

14. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, a detector including a pair of circuits each having a pair of substantially unilaterally conductive devices connected in series, means for energizing said circuits in parallel from said oscillator in balanced relationship, said unilaterally conductive devices being poled to pass current in alternate circuits during alternate half-cycles of the oscillator output, a capacitor connected to the point of balance of said energizing means, means for supplying the output of said differential transformer through said capacitor to said point of balance, a pair of capacitors connected in series between points of said circuits which are between the unilaterally conductive devices in respective circuits, and a resistance connected between said point of balance and the common junction of said pair of capacitors, whereby a substantially D.-C. output may be obtained proportional to departures from the null position of said differential transformer and of opposite sign on opposite sides of said null.

15. Apparatus for gaging and controlling a machine tool which comprises a gaging device including a variable differential transformer having a movable element varying with part size, an oscillator for energizing said differential transformer, said differential transformer yielding an A.-C. output signal varying in amplitude with departures from the null position of the movable element and of opposite phase on opposite sides of the null, an amplifier connected to said differential transformer for amplifying the output thereof, a phase-sensitive detector including a pair of circuits each having a pair of diodes connected in series, means for energizing said circuits in parallel from said oscillator in balanced relationship, said diodes being poled to pass current in alternate circuits during alternate half-cycles of the oscillator output, a capacitor connected to the point of balance of said energizing means, means for supplying the output of said amplifier through said capacitor to said point of balance, a pair of capacitors connected in series between points of said circuits which are between the diodes in respective circuits, and a resistance connected between said point of balance and the common junction of said pair of capacitors, whereby a substantially D.-C. output may be obtained proportional to departures from the null position of said differential transformer and of opposite sign on opposite sides of said null.

References Cited in the file of this patent

UNITED STATES PATENTS

| | | |
|---|---|---|
| 2,503,851 | Snow | Apr. 11, 1950 |
| 2,641,876 | Decker et al. | June 16, 1953 |
| 2,745,221 | Comstock | May 15, 1956 |